United States Patent
Mazzara, Jr.

(10) Patent No.: US 9,854,442 B2
(45) Date of Patent: Dec. 26, 2017

(54) ELECTRONIC CONTROL UNIT NETWORK SECURITY

(71) Applicant: GM Global Technology Operations LLC, Detroit, MI (US)

(72) Inventor: William E. Mazzara, Jr., Drayton Plains, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 248 days.

(21) Appl. No.: 14/543,120

(22) Filed: Nov. 17, 2014

(65) Prior Publication Data

US 2016/0142410 A1    May 19, 2016

(51) Int. Cl.
  *H04L 29/06* (2006.01)
  *H04W 12/08* (2009.01)
  *H04L 29/08* (2006.01)
  *H04W 12/12* (2009.01)
  *H04W 4/04* (2009.01)

(52) U.S. Cl.
  CPC .......... *H04W 12/08* (2013.01); *H04L 63/029* (2013.01); *H04L 67/04* (2013.01); *H04L 67/12* (2013.01); *H04L 67/22* (2013.01); *H04L 63/105* (2013.01); *H04W 4/046* (2013.01); *H04W 12/12* (2013.01)

(58) Field of Classification Search
  CPC ...... H04L 63/029; H04L 67/12; H04W 12/08; H04W 12/12
  See application file for complete search history.

(56) References Cited

U.S. PATENT DOCUMENTS

| | | | |
|---|---|---|---|
| 7,856,299 B2 * | 12/2010 | Fink | G01R 31/007 701/31.4 |
| 2003/0009271 A1 * | 1/2003 | Akiyama | G06F 21/335 701/29.6 |
| 2005/0025289 A1 * | 2/2005 | Hogdahl | B60R 25/102 379/37 |

(Continued)

OTHER PUBLICATIONS

Clare et al., "Automotive Security Best Practices: Recommendations for Security and Privacy in the Era of the Next-Generation Car", Retrieved from Retrieved from http://www.mcafee.com/us/resources/white-papers/wp-automotive-security.pdf, Published Jun. 2016, pp. 1-19.*

(Continued)

*Primary Examiner* — Chau Le
(74) *Attorney, Agent, or Firm* — Christopher DeVries Reising Ethington P.C.

(57) ABSTRACT

A system and method of controlling access to a vehicle network that includes a plurality of electronic control units (ECUs) communicating over the network. The method carried out by the system operates a network of ECUs that include at least first and second ECUs in communication with each other over the network. The first ECU may be an external access point which can establish communication with an external device. The first ECU provides the external device with limited privilege access to the network. The method further includes detecting unauthorized escalated privilege access of the first ECU, and in response to the detection, at least partially restricting use of the first ECU as the external access point, thereby preventing external devices from using the first ECU for the limited privilege access to the network.

16 Claims, 3 Drawing Sheets

(56) References Cited

U.S. PATENT DOCUMENTS

| | | | |
|---|---|---|---|
| 2006/0130033 A1* | 6/2006 | Stoffels | G06F 8/61 717/166 |
| 2008/0195299 A1* | 8/2008 | Barnicle | G08C 17/02 701/115 |
| 2009/0030570 A1* | 1/2009 | Regnard De Lagny | G07C 5/0816 701/33.4 |
| 2009/0177352 A1* | 7/2009 | Grau | G07C 5/008 701/31.4 |
| 2011/0205040 A1* | 8/2011 | Van Wiemeersch | B60R 25/00 340/426.1 |
| 2011/0264718 A1* | 10/2011 | Chen | G06F 9/45537 707/831 |
| 2012/0110296 A1* | 5/2012 | Harata | G06F 12/06 711/203 |
| 2013/0111582 A1* | 5/2013 | Forest | G06F 21/44 726/19 |
| 2013/0227650 A1* | 8/2013 | Miyake | H04L 63/08 726/3 |
| 2014/0075517 A1* | 3/2014 | Alrabady | G06F 21/572 726/4 |
| 2017/0161495 A1* | 6/2017 | Viswanath | G06F 21/554 |

OTHER PUBLICATIONS

Craig Smith, "2014 Car Hackers Handbook", Retrieved from http://opengarages.org/handbook/2014_car_hackers_handbook_compressed.pdf, Published Jul. 20, 2014, pp. 1-71.*

Wind River, "Improving Android Security for Automotive with a Defense-in-Depth Strategy", Retrieved from http://www.windriver.com/whitepapers/improving-android-security/Improving-Android-Security-for-Automotive-whitepaper.pdf, Published Feb. 24, 2014, pp. 1-8.*

Valasek et al., "Adventures in Automotive Networks and Control Units", Retrieved From https://ioactive.com/pdfs/IOActive_Adventures_in_Automotive_Networks_and_Control_Units.pdf, Published Aug. 5, 2013.*

* cited by examiner

ELECTRONIC CONTROL UNIT NETWORK SECURITY

TECHNICAL FIELD

The present invention relates to electronic control unit (ECU) network security, and more specifically to root detection in an ECU network.

BACKGROUND

The ability to electronically control and obtain information from vehicles is increasing with each new model year. This increase in electronic access, both locally (at the vehicle) and remotely (via cellular or other wireless communication), brings with it an increased possibility of attempted vehicle data hacking and even vehicle hijacking or theft as a result of being hacked. A vehicle hacker may utilize wireless communication with one or more of the vehicle's transceivers in order to gain access to other intelligent systems within the vehicle. By virtue of such access, the hacker may attempt to exploit the vehicle's systems which could lead to, for example, unauthorized access of vehicle data, malicious interference with vehicle operation, and possibly gaining physical access to the vehicle and its contents which may then be hijacked or stolen.

Authentication, encryption, and other access control techniques may be used to help prevent such unauthorized access. But these techniques may not protect against unintended exploits in the vehicle software systems by which a hacker may be able to circumvent or overcome such access control techniques.

SUMMARY

According to an embodiment of the invention, there is provided a method of controlling access to a vehicle network that includes a plurality of electronic control units (ECUs) communicating over the network. The method includes the steps of: operating a network of ECUs that include at least first and second ECUs in communication with each other over the network, wherein the first ECU comprises an external access point that enables access to the network via the first ECU by devices external to the network; establishing communication between the first ECU and an external device; providing the external device with limited privilege access to the network via the first ECU, wherein the step of providing limited privilege access comprises one or both of: (i) sending instructions from the first ECU to the second ECU based on a communication received at the first ECU from the external device; and (ii) transmitting from the vehicle via the first ECU data that is sent from the second ECU to the first ECU; detecting unauthorized escalated privilege access of the first ECU; and in response to the detection, at least partially restricting use of the first ECU as the external access point, thereby preventing external devices from using the first ECU for the limited privilege access to the network.

According to another embodiment of the invention, there is provided a vehicle network of electronic control units (ECUs). The network includes: a plurality of ECUs; and a communication means for enabling communication between one or more of the plurality of ECUs. At least one of the plurality of ECUs may be an external access point ECU. And the external access point ECU is programmed to execute a process that detects an unauthorized escalation of privileges at the external access point ECU.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method(s) described below pertain controlling access to a vehicle network that includes a plurality of electronic control units (ECUs) communicating over the network. Controlled access can limit or prevent a malicious attack on the vehicle network. As described below, at least one of the ECUs may be configured as an external access point for extra-network communication (i.e., communication with devices outside of the ECU network). This configuration enables a external device to communicate with ECUs on the network according to a limited privilege access. The method(s) described below provide detection and responsive action to an unauthorized escalated privilege access by the external device. The ECU configured for extra-network communication may detect this unauthorized privilege escalation and protect itself and the network by restricting the external device's communication with the network.

Figure 1:
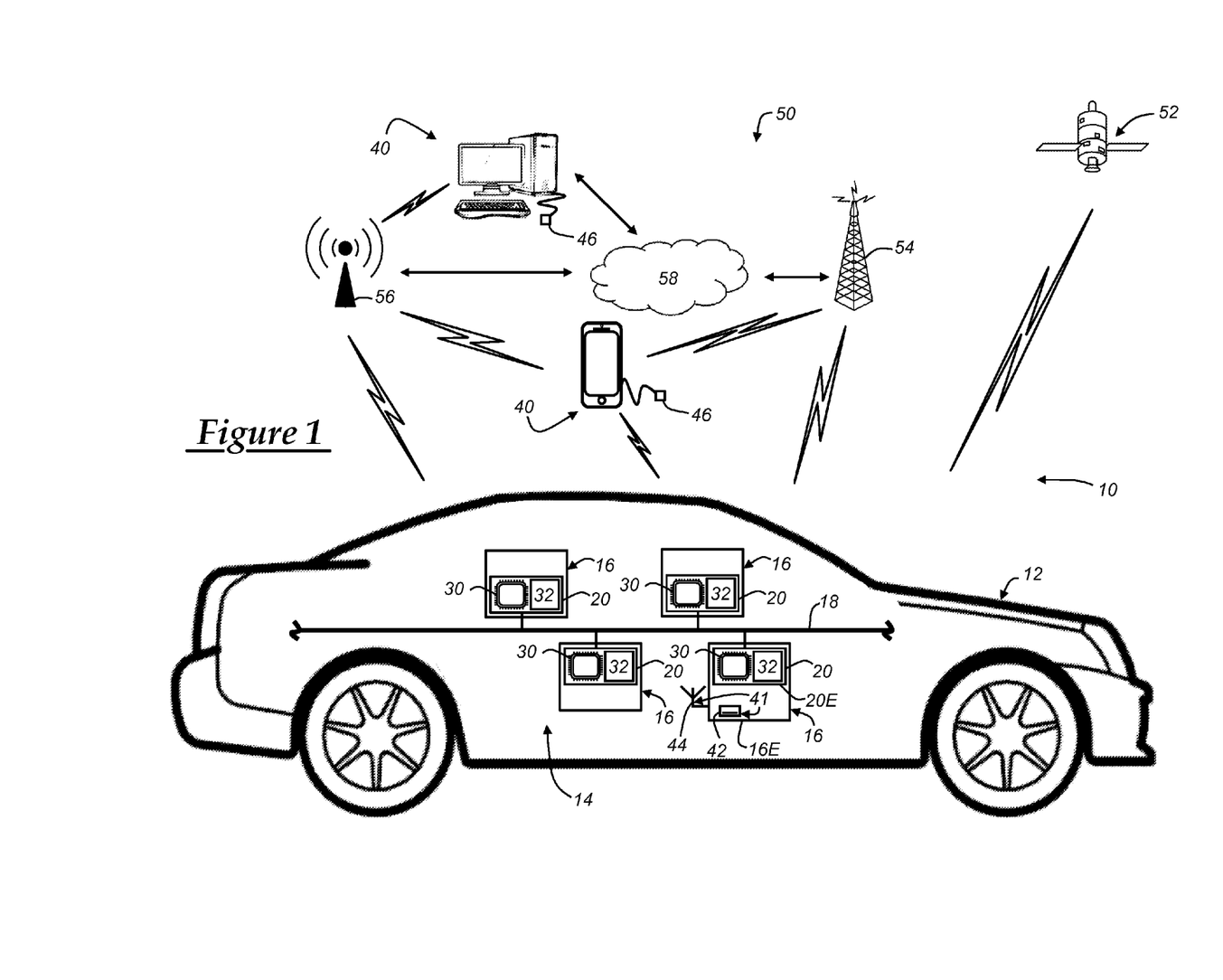
FIG. 1 is a block diagram depicting an embodiment of a communications system that is capable of utilizing the method disclosed herein.

FIG. 1 illustrates a communication system 10 to suitably enable intra- and extra-vehicle communication. The communication system 10 may include a vehicle 12; for example, the vehicle is depicted as a passenger car, but it should be appreciated that any other vehicle including motorcycles, trucks, sports utility vehicles (SUVs), recreational vehicles (RVs), marine vessels, aircraft, etc., can also be used. Thus, while the illustrated platform is a vehicle, it should be appreciated that this is merely an example.

The vehicle 12 includes a network 14 of system modules (SMs) 16 coupled together via a communication means 18. The SMs 16 include electronic hardware components that may be located throughout the vehicle 12 and typically receive input from one or more vehicle sensors and use the sensed input to perform diagnostic, monitoring, control, reporting and/or other functions. For example, one or more of the SMs may be programmed to run vehicle system and subsystem diagnostic tests. Another SM may be an engine control module (ECM) that controls various aspects of engine operation such as fuel ignition and ignition timing; another SM can be a powertrain control module that regulates operation of one or more components of the vehicle powertrain; and another SM can be a body control module (BCM) that governs various electrical components located throughout the vehicle, like the vehicle's power door locks and headlights. As is appreciated by those skilled in the art, the above-mentioned SMs are only examples of some of the modules that may be used in vehicle 12, as numerous others are also possible. Likewise, other platforms may include SMs suitable to that particular communication system; e.g., in one embodiment, the SMs may include modules of an architectural building.

Each SM 16 may comprise at least one electronic control unit (ECU) 20. Further, each ECU 20 may comprise one or more processors 30 and memory 32. Processors may be any type of device capable of processing electronic instructions including microprocessors, microcontrollers, host processors, controllers, vehicle communication processors, and application specific integrated circuits (ASICs). The processor may be a dedicated processor used only for the particular SM 16 or it may be shared with other vehicle systems. Processors may execute various types of digitally-stored instructions, such as software or firmware programs stored in memory 32, which enable the SM to provide vehicle services or perform vehicle tasks. For instance, processor 30 can execute programs or process data to carry out at least a part of the method discussed herein. Memory 32 may be any suitable non-transitory computer usable or readable medium. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. These are merely examples. Skilled artisans will appreciate other implementations of the processor(s) 30 and memory 32, as well as their implementation and operation.

The communication means 18 coupled to the SMs 16 may include any serial or parallel communication devices for intranet communication (i.e., within the network 14). Further, communication means 18 may be wired, wireless, or both. Thus, for example, communication means 18 may include use of Ethernet or discrete wiring including two-wire differential cables for any suitable local area network (LAN), as illustrated in FIG. 1. Communication means 18 further may include any suitable SRWC hardware capable of utilizing any suitable SRWC protocol; examples of SRWC protocols include: Near-Field Communication (NFC), any Wi-Fi standard (e.g., IEEE 802.11); Wi-Fi Direct, Bluetooth (including low-energy standards), Digital Living Network Alliance (DLNA), or other suitable peer-to-peer standard; wireless infrared transmission; WiMAX; ZigBee™; and/or various combinations thereof. This list is merely meant to provide examples and is not intended to be limiting. Thus, in one embodiment, the communication means 18 enables at least one of a Controller Area Network (or CAN), MOST, a proprietary LAN, an Audio Video Bridging (AVB) network, a Bluetooth network, a Wi-Fi Direct network, etc. In some embodiments, multiple communication means 18 are implemented between the ECUs 20 of the SMs; therefore, the network 14 may be considered a network of SMs, a network of ECUs, or both.

FIG. 1 illustrates that one or more of the SMs 16 and/or ECUs 20 also may be configured to communicate with external devices 40 (in addition to other ECUs 20 within the network 14). FIG. 1 illustrates SM 16E and ECU 20E configured for such extra-vehicle communication; i.e., the SM or ECU may comprise an external access component or module 41 that includes a connector 42 for wired connections (e.g., an OBDII port, a USB port, etc.) or a wireless transceiver (see FIG. 2) and an antenna 44 for wireless connections (SRWC, cellular, etc.).

External devices 40 include computers and hand-held or mobile devices. For example, computers can be any one of a number of computers accessible via private and/or public communication networks such as the Internet. The term computer should be construed broadly to include any processing device coupled to memory and operative by firmware and/or software. For example, the computer may be a remotely located server, desktop PC, etc. or a proximately located diagnostic device, just to name a few examples. Likewise, mobile devices also should be construed broadly to include any electronic device capable of two-way communication (e.g., cellular, SRWC, USB, Ethernet, etc.). Non-limiting examples of the mobile device include a cellular telephone, a personal digital assistant (PDA), a smartphone, a personal laptop computer or tablet computer, a netbook computer, a diagnostic device, or combinations thereof. Thus, the external devices 40 may communicate via wired transmission (e.g., via a connector 46) or via a wireless transmission via cellular communication, SRWC, etc.

Communication between external devices and the network 14 may utilize a communication infrastructure 50. The infrastructure 50 may include one or more satellites 52, cellular communication equipment 54 (e.g., for CDMA, GSM, and LTE communication, just to name a few examples), short-range wireless communication (SRWC) equipment 56 (e.g., for Wi-Fi, Wi-Fi Direct, and Bluetooth communication, just to name a few examples), land network equipment 58, etc. Thus, communication infrastructure is intended to be construed broadly to include wired and/or wireless hardware and communication protocols. Thus, in one embodiment, external devices 40 may communicate with at least one of the ECUs 20 via SRWC (such as Bluetooth or Wi-Fi). In other embodiments, external devices 40 may communicate with one or more ECUs 20 via cellular communication or even wired communication. In wired embodiments, the external device 40 may establish a wired link or connection with an ECU via a harness and connector 46 (e.g., via USB or via an OBDII port). These examples are not intended to be limiting; other implementations also exist.

Figure 2:
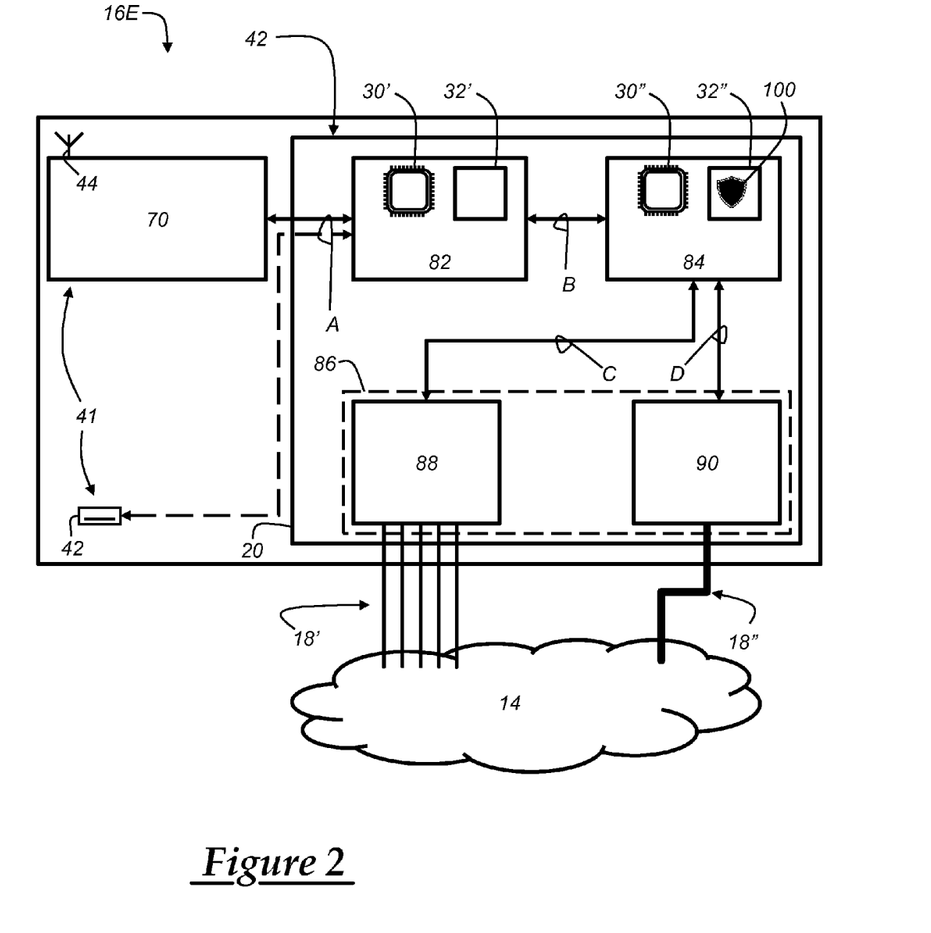
FIG. 2 is a more detailed view of a portion of the communications system shown in FIG. 1.

SM 16E and ECU 20E, which are shown in FIG. 1, are shown in greater detail in FIG. 2. According to one illustrative embodiment, SM 16E may be an embedded telematics unit in the vehicle 12. Telematics devices may be used to provide a diverse range of vehicle services that involve wireless communication to and/or from the vehicle via module 41 (e.g., a wireless transceiver 70). The transceiver 70 may have one or more cellular chipsets enabling cellular communication via GSM, CDMA, and LTE technologies, just to name a few examples. The transceiver may also have SRWC chipsets enabling communication via Bluetooth, Wi-Fi, Wi-Fi Direct, etc. Additionally, the wireless transceiver 70 may include any suitable chipsets, circuits, antennas, etc. Both cellular and SRWC technologies may use voice calls, data calls, or both to provide numerous vehicle services including: infotainment services, entertainment services, SMS services, GPS-related services, diagnostic services, vehicle data upload services, SM or ECU software download services, emergency/roadside services, just to name a few non-limiting examples. Telematics units may have other modules 41 as well (e.g., such as connector 42).

According to another embodiment, SM 16E may be a vehicle head unit configured to provide radio and other media services to vehicle users. The head unit may have one or more modules 41 as well. For example, the head unit may provide SRWC services via wireless transceiver 70 and antenna 44, or it may provide connectivity via a physical interface (e.g., via connector 42). In some implementations, the head unit may provide a variety of telematics-type services as well; particularly in instances where a head unit and a telematics device are electrically coupled to one another within the vehicle 12.

Other examples of SM 40E and ECU 20E may include any other device capable of vehicle-to-vehicle communication and other vehicle-to-infrastructure communication, as those terms are understood by skilled artisans.

According to one embodiment of SM 16E, the ECU 20E may comprise multiple computer processing units (CPUs). As shown in FIG. 2, the ECU 20E comprises an external interface CPU 82, a gateway CPU 84, and a network interface 86. The interface CPU 82 may comprise a processor 30' and memory 32' and may be coupled (via connection A) directly with the one or more modules 41. The gateway CPU 84 may comprise a processor 30" and memory 32" and be coupled (via connection B) to the interface CPU 82. Here, like numerals denote like features and elements; therefore, the previous description of the processor and memory will not be repeated. According to at least one embodiment, interface CPU 82 may be configured with a known operating system (OS) (e.g., Linux, Android, iOS, etc.); gateway CPU 84 may have a similar or different OS. And while the CPU 82 and CPU 84 are shown as separate devices—i.e., physically and logically separated—other implementations also exist. For example, CPU 82 and CPU 84 may be a single device having a physical partition, a logical partition, or both.

As noted above, each CPU 82, 84 (or each CPU portion in the case of a partitioned single processor device) includes an OS and may include other software executed by the CPU to perform particular functions or actions. This may include particular vehicle functions carried out by the SM 16E as well as implementation of ECU 20E as an external access point. As is known, the OS itself may have root level privileges that enable it to carry out any action available via its CPU, including controlling access to the network 14, carrying out commands that control vehicle functions, accessing protected and unprotected areas of the memory, and changing its or other programming on the SM 16E or on other networked devices. The OS also enforces limited privilege access (e.g., user privilege or other non-root privilege) in which case software processes and external devices are only able to carry out a subset of all of the actions or functions which the OS and CPU are capable of carrying out. This may include blocking access to protected areas of memory, limiting the creation or deletion or alteration of files in memory, restricting what vehicle functions and other command and control may be carried out by the external device or other software process, limiting access to certain ECUs on the network 14 or limiting access to certain data from over the network 14.

Apart from the OS on the CPU(s), there may also be included a supervisory process that monitors operation of any of the OS's to detect any unauthorized escalated privilege that might be exploited to gain root level or other higher privilege access than is desired. For example, the gateway CPU 84 may configured with a root detection or other supervisory process 100 implemented as software stored in memory 32" and executable by processor 30". This software process 100 can be used both for detecting escalated privilege access as well as to then respond by at least partially restricting the use of ECU 20E as an external access point. This can be done in a variety of different ways depending upon the particular implementation of the ECU, but in the illustrated embodiment, may involve blocking communication at the gateway ECU, either at point B shown in FIG. 2 (between CPUs 82 and 84), or at points C and D (between the CPU 84 and interface 86).

Examples of different ways of restricting the use of ECU 20E as an external access point include reducing (or entirely inhibiting) the communication of data between module(s) 41 and the network 14. Or, the process 100 may entirely block and/or disable communication between ECU 20E and the external device 40; e.g., ECU 20E may continue to communicate with network 14, however, it will be unable to communicate with external device 40. Alternatively, entirely blocking and/or disabling communication may include enabling the ECU 20E to communicate with the external device 40, however, inhibiting ECU 20E from communicating with the network 14. In one particular example, the gateway CPU 84 inhibits all commands (instructions) and data from the external device 40 from being transmitted onto the network 14 (e.g., all commands and data pertaining to critical safety systems in the vehicle 12 such as steering data, engine data, braking data, etc. or all data pertaining to user or vehicle security such as secret, private, or proprietary data). In another embodiment, the process 100 selectively may restrict what extra-vehicle data and/or commands are passed through ECU 20E. For example, the gateway CPU 84 (ECU 20E) may filter what data and/or commands may be sent from the external device 40 to other ECU(s) 20 in the network 14. In one particular example, the gateway CPU 84 may inhibit any vehicle command originating from the external device 40 from being received by another ECU 20 while permitting inert or passive data from such external device.

In at least one embodiment, the process 100 identifies a root detection condition of ECU 20E. For example, rooting of the ECU includes attaining privileged control of the ECU or another electronic device or system via the ECU (i.e., root access). In at least one implementation, rooting may include a superuser status (e.g., special user status or administrator status). Rooting may be performed by an authorized or unauthorized user; and unauthorized users may attempt or succeed in rooting one of the ECUs 20 of the network 14 for malicious purposes (e.g., ECU 20E). To protect against this, the supervisory process 100 may be used to monitor its own CPU and/or OS, or monitor operation of another CPU or OS (such as interface CPU 82) to determine or detect one or more characteristics of a rooted device (e.g., including whether the rooting occurred previously, or is on-going). Rooting characteristics may be determined based on the behavior of CPU 82, especially in view of normal characteristics of a known CPU operating system (OS) (e.g., the OS of CPU 82). According to one example, rooting characteristics includes detecting or determining the use of special purpose operating system (OS) commands or the existence of one more previously known abnormal file (or filing system) indicators.

An example of a special purpose OS command is "SUDo"—a command to perform "Do" (i.e., an action) at a superuser (SU) level. Some OS utilities or programs (e.g., using Linux OS) having such special purpose OS commands do not require SUDo to perform them; hence, when SUDo is used in conjunction with such an OS, a rooting characteristic may be detected or determined—as this would be outside the course of normal or typical operation or behavior.

In another example, the mere existence of certain files in use by the OS or certain customizations incorporated into the file distribution may signal or cause the OS to behave in an abnormal manner. Thus, the file(s) or filing system may be abnormal or atypical. One example of such a file is a semaphore file (e.g., used in an Android OS). Thus, the root detection set of instructions may be able to recognize which semaphore files should be included in typical user distributions—and when one or more abnormal semaphore files are detected or determined, this may be indicative of a rooting characteristic. Such an abnormal or atypical file can be considered an unauthorized file indicative of unauthorized escalated privilege access.

A single detected root characteristic may or may not be sufficient to determine whether an ECU 20 has been rooted. In some instances, multiple rooting characteristics may be assessed using the process 100 before a rooted ECU (or CPU therein) condition is determined.

Again, the previously described instances were merely examples of privilege escalation and how it may be detected; skilled artisans will appreciate other rooting characteristics. Further, determination of a root detection condition (such as a rooted CPU 82) is merely one example of an escalated privilege access for which it is desired to then at least partially restrict use of ECU 20E as an external access point.

Returning to FIG. 2, the network interface 86 may comprise one or more physical interfaces between the ECU 20E and the communication means 18. In FIG. 2, two interfaces are shown—an Ethernet switch 88 and an Ethernet bus coupler 90—coupled to communication means 18' and 18", respectively. Gateway CPU 84 is coupled to Ethernet switch 88 via connection C, and gateway CPU 84 is coupled to bus coupler 90 via connection D. Ethernet switch 88 may have multiple ports and communication means 18' for interconnecting or meshing ECU 20E with other ECUs 20 (e.g., operative according to an AVB protocol). And bus coupler 90 may have a single connection to a serial bus 18" (e.g., operative according to a CAN or proprietary LAN protocol). These of course are merely examples. ECU 20E may include the switch 88, the coupler 90, or both. Or the ECU 20E may have another suitable network interface 86.

Thus, ECU 20E, and any other ECU 20 having module 41, may be capable of carrying out a set of actions dependent on its programming. These actions include accessing memory 32', 32" (some of which may be protected, requiring a higher privilege level, some of which may not); accessing data from sensors or other ECUs 20; and/or controlling actuators or subsystems or other ECUs 20 in the vehicle 12. The processor 30', 30" may execute an OS by which ECU 20E may provide external devices 40 with network access that is limited to a subset of the actions that the OS and/or processor(s) are capable of carrying out.

Figure 3:
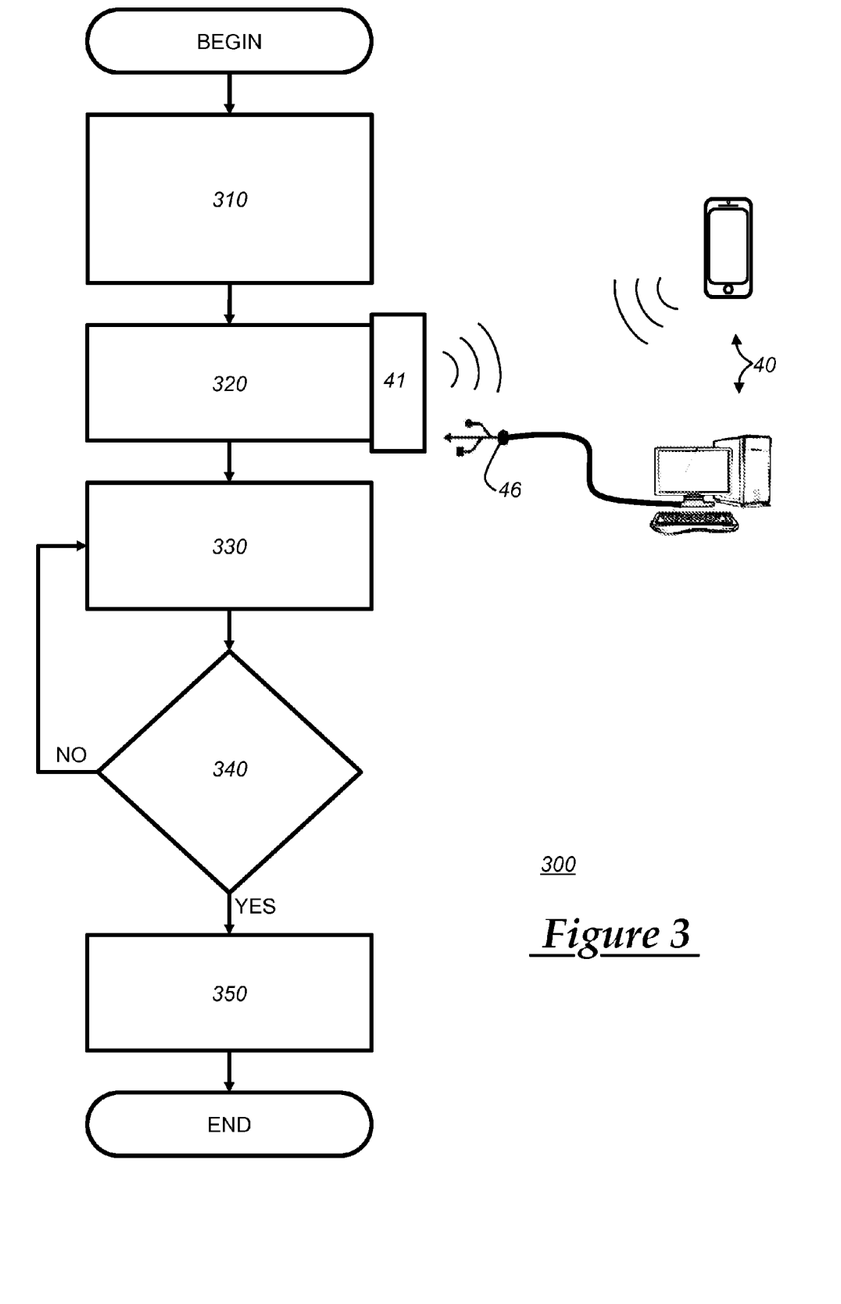
FIG. 3 is a flow diagram of a method of using the communications system.

FIG. 3 illustrates one method 300 for monitoring and protecting the ECU network 14 in the event one of the ECUs 20 is maliciously attacked. The method begins with step 310—carrying out the process 100 at one or more ECUs 20 (e.g., ECU 20E). This may include an initial step of the vehicle manufacturer providing the supervisory process software 100 to memory 32" of the gateway CPU 84 (in ECU 20E) and/or configuring its processor 30" to execute the software. And as will be discussed below, the process further includes conditional actions restricting use of ECU 20E as an external access point. The software 100 also may be provided after-market; e.g., from a remote server or vehicle call center to the vehicle 12. In any event, the process 100 is carried out to monitor the external access point ECU to detect any rooted condition or other unauthorized escalated privilege access. Following step 310, the method proceeds to step 320.

In step 320, the ECU 20E establishes extra-network communication with at least one external device 40 via module(s) 41 (e.g., via SRWC, cellular, or a wired connection). This may further include communications following establishment. Establishing extra-vehicular communication may be in accordance with known protocols; and techniques for establishing and participating in such communication is known to skilled artisans. Thereafter, the method may proceed to step 330.

In step 330, the ECU 20E may provide the external device 40 with limited privilege access to the network 14 by enabling communication of inbound or outbound messages—i.e., messages containing data and/or instructions or commands. Thus, limited privilege access may include: (a) receiving an inbound message from external device 40 and sending that message or a related message from ECU 20E to another ECU 20 in network 14; (b) transmitting an outbound message from the vehicle 12 via ECU 20E to the external device 40, wherein the message originated at another ECU 20 (e.g., ECU 20 to ECU 20E to external device 40); or both (a) and (b). As discussed above, the limited privilege access permits carrying out of a subset of the actions that ECU 20E is capable of carrying out, such that, for example, communication between an ECU on the network 14 and an external web server may be carried out via the external access point ECU 20E, but reprogramming of any of the ECUs 20 or the storing of a file or modification of a file on ECU 20E or other ECUs 20 from an external device may not be done.

During operation of ECU 20E as an external access point (e.g., during step 330), ECU 20E also carries out step 340 in which ECU 20E monitors for unauthorized escalated privilege access which may be indicative of a malicious attack. Some of the indications of an unauthorized escalated privilege access are discussed above including detecting root level access. Unauthorized escalated privilege access may include access to or attempted access to other ECUs 20 on the network 14 via ECU 20E (which behaves as an external access point). Or such access may include access to only ECU 20E which thereby permits the external device 40 to control ECU 20E operations or interactions on the network 14. In at least one embodiment, unauthorized escalated privilege access includes access that involves or enables carrying out a larger subset (or an entire set) of actions that ECU 20E is capable of carrying out (e.g., at a level of administrator access or root access). In another embodiment, unauthorized escalated privilege access includes access that permits carrying out actions beyond or greater than the scope of what were included in the unaltered OS.

If no unauthorized escalated privilege access is detected, the method may repeat and/or loop back to step 330—i.e., the method may continue to provide limited privilege access to the network 14 by the external device 40. However, if unauthorized escalated privilege access is determined in step 340, the method proceeds to step 350.

In step 350, use of ECU 20E may be at least partially restricted based on the determination in step 340. For example, the process 100 may reduce (or entirely inhibit) the communication of data between external device(s) 40 and the network 14. As discussed above, restricted use may comprise strict and total inhibition of access or partial inhibition of access. Thus in one embodiment, ECU 20E enters a blocking mode wherein all extra-vehicle messages are strictly inhibited. In this mode, ECU 20E is disabled as an external access point. And in other embodiments, ECU 20E enters a partial blocking mode wherein some messages may be communicated between the network 14 (or its ECUs 20) and the external device 40 while other messages therebetween are strictly intercepted.

In at least one embodiment, the detected unauthorized escalated privilege access involves corruption or control of CPU 82, and the network 14 is protected from malicious harm based on the process 100, as well as a physical partition between CPU 82 and gateway CPU 84, a logical partition therebetween, or both. The period of restricted use may be temporary; e.g., until the vehicle 12 can be inspected by authorized service personnel.

In addition, in some embodiments, step 350 may comprise the triggering of an alert. For example, ECU 20E (or another ECU 20) may provide a notification to a user of the vehicle, a remote server, or both of the condition of unauthorized escalated privilege access.

According to at least one embodiment, steps 340 and 350 may be used for detecting a rooted condition of ECU 20E. More specifically, these steps may be used to determine that CPU 82 has been or is being rooted by the external device 40. In step 340, the condition may be detected based on detecting one or more rooting characteristics, weighing the one or more rooting characteristics in view of predetermined criteria, and then assessing that the ECU 20E has been rooted. In some instances, step 340 may include storing detected characteristics for a predetermined period of time— e.g., and monitoring for additional detections during that period of time. In addition, the threshold for detection may be higher or lower depending upon the type of data provided between ECUs 20 or to the outside of the network 14 via ECU 20E. For example, the higher the sensitivity of data traversing the ECU network 14, the lower the threshold may be set. Similarly, when data sensitivity is lower, a higher threshold may be desirable. Regardless, skilled artisans will appreciate the various techniques to determine the root detection condition at any suitable threshold.

In at least one embodiment, when step 340 determines the root detection condition, the external device 40 is considered a malicious device and in step 350, no messages transmitted from the external device 40 are delivered to the network 14.

In the illustrated embodiment of FIG. 2, there is used two CPUs in the ECU 20E which may help avoid a successful use of an exploit to gain root or other escalated privilege access. By having two CPUs (e.g., 82, 84) within ECU 20E, one more protected CPU (gateway CPU 84) may be capable of detecting unauthorized escalated privilege access of the less protected CPU (interface CPU 82) such that a malicious attack may be detected and prevented before being successful. Similarly, embodiments having a single, partitioned CPU (e.g., having a first and second partition) where the first partition of the CPU has been attacked, the second partition may be capable of identifying the unauthorized escalated privilege access thereof.

In other embodiments, only a single CPU may be used in the external access point ECU and can include the process 100 for monitoring its own operation. This could be by, for example, monitoring checksums of certain files or memory spaces to make sure they are unaltered. The ECU, upon detecting unauthorized escalated privilege access can then shut its operation down partially or fully.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling access to a vehicle network that includes a plurality of electronic control units (ECUs) communicating over the network, comprising the steps of:
    operating a network of ECUs that include at least first and second ECUs installed in the vehicle and in communication with each other over the network, wherein the first ECU comprises an external access point that enables access to the network via the first ECU by devices external to the network;
    establishing communication between the first ECU and an external device;
    providing the external device with limited privilege access to the network via the first ECU, wherein the step of providing limited privilege access comprises one or both of:
        (i) sending digital instructions from the first ECU to the second ECU based on a communication received at the first ECU from the external device; and
        (ii) transmitting from the vehicle via the first ECU digital data that is sent from the second ECU to the first ECU;
    detecting unauthorized escalated privilege access of the first ECU; and
    in response to the detection, selectively restricting use of the first ECU as the external access point at least partially, thereby preventing external devices from using the first ECU for the limited privilege access to the network;
    wherein the step of providing limited privilege access to the network further comprises providing access to the network under control of an operating system that limits what actions may be initiated by the external device to a subset of all of the actions capable of being carried out using the operating system; and
    wherein the step of detecting unauthorized escalated privilege access comprises detecting occurrence of an action at the first ECU that is not within the subset of actions.

2. The method of claim 1, wherein the first ECU communicates with the external device over one or both of a wired connection and a wireless connection.

3. The method of claim 2, wherein the first ECU communicates wirelessly with the external device or is connected to a wireless communication module that enables the first ECU to communicate wirelessly with the external device via the communication module.

4. The method of claim 1, wherein the step of detecting unauthorized escalated privilege access further comprises detecting a command to perform at a superuser level (SUDo) in an operating system (OS) that does not require SUDos or identifying an unauthorized file on the first ECU.

5. The method of claim 1, wherein the step of detecting unauthorized escalated privilege access further comprises running an operating system (OS) on a first central processing unit (CPU) of the ECU, and running an access monitoring process on a second CPU of the ECU, wherein the access monitoring process monitors the OS on the first CPU for activity indicative of unauthorized privilege escalation.

6. The method of claim 1, wherein access to the network from the external device is carried out via the first and second CPUs and wherein the step of at least partially restricting use of the first ECU further comprises blocking communication between the external device and network at the second CPU.

7. The method of claim 1, wherein the step of at least partially restricting use of the first ECU further comprises switching into a blocking mode at the vehicle during which neither step (i) or (ii) are carried out.

8. The method of claim 1, wherein the step of at least partially restricting use of the first ECU further comprises disabling operation of the first ECU as an external access point.

9. The method of claim 1, wherein the step of at least partially restricting use of the first ECU further comprises restricting communication between the first ECU and one or more other ECUs on the network.

10. A vehicle network of electronic control units (ECUs), comprising:
a plurality of ECUs installed in a vehicle; and
a communication means for enabling communication between one or more of the plurality of ECUs,
wherein at least one of the plurality of ECUs is an external access point ECU,
wherein the external access point ECU is programmed to execute a process that detects an unauthorized escalation of privileges at the external access point ECU and selectively restricts access via the external access point ECU in response to the detection;
wherein the external access point ECU is programmed to selectively restrict access via the external access point ECU by providing access under control of an operating system that limits what actions may be initiated by an external device to a subset of all of the actions capable of being carried out using the operating system, wherein the unauthorized escalated privilege access is detected when an action at the external access point ECU is detected that is not within the subset of actions.

11. A vehicle network as defined in claim 10, wherein the external access point ECU comprises an interface central processing unit (CPU) and a gateway CPU, wherein the interface CPU is configured for communication with an external device, and wherein the gateway CPU is in communication with at least one of other of the plurality of ECUs via the communication means such that access to the at least one other ECU by the external device is carried out via both the interface CPU and the gateway CPU.

12. A vehicle network as defined in claim 11, wherein the process is carried out on the gateway CPU and is operable to monitor the interface CPU for the unauthorized escalation of privileges.

13. A vehicle network as defined in claim 10, wherein the external access point ECU comprises a partitioned central processing unit (CPU) comprising an interface portion and a gateway portion, wherein the interface portion is configured for communication with an external device, and wherein the gateway portion is in communication with at least one of other of the plurality of ECUs via the communication means such that access to the at least one other ECU by the external device is carried out via both the interface portion and the gateway portion.

14. A vehicle network as defined in claim 13, wherein the process is carried out on the gateway portion and is operable to monitor the interface portion for the unauthorized escalation of privileges.

15. A vehicle network as defined in claim 10, wherein the external access point ECU is operable in a normal mode to provide limited privilege access to the network by external devices via the first ECU, and wherein the external access point ECU is operable to switch to a blocking mode in response to detecting the unauthorized escalation of privileges at the external access point ECU, wherein the blocking mode prevents the limited privilege access by the external devices.

16. A vehicle network as defined in claim 10, wherein the process comprises a root detection program.

* * * * *